3,467,663
DERIVATIVES OF 2,6- AND 2,5-BIS (HYDROXY-METHYL)PYRIDINES
Michiro Inoue, 12 Tada-machi, Nakano-ku, Tokyo, Japan; Masayuki Ishikawa and Hisako Ishikawa, both of 208, E-22, Tokiwadaira-Danchi, Matsudo-shi, Chiba-ken, Japan; and Takio Shimamoto, 13 Kita-machi, Shinjuku-ku, Tokyo, Japan
No Drawing. Filed Apr. 10, 1964, Ser. No. 358,923
Claims priority, application Japan, Apr. 13, 1963, 38/17,978, 38/17,979, 38/17,980; Apr. 7, 1964, 39/19,329, 39/19,330, 39/19,331
Int. Cl. C07d *31/48;* A61k *25/00*
U.S. Cl. 260—294.8       12 Claims The present invention relates to bis(hydroxymethyl)-pyridine dicarbamate and dithioncarbamate derivatives which are novel pharmaceutical compounds and represented by the following general formula:

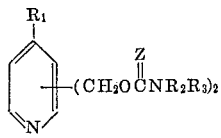

wherein each Z stands for either oxygen or sulfur, $R_1$ stands for hydrogen or halogen atom, alkyl, hydroxyl, alkoxyl, thiocyano, amino, acylamino, alkylamino, arylamino, alkylthio, arylthio, alkylsulfonyl, or arylsulfonyl group; $R_2$ stands for hydrogen atom or alkyl, fluoroalkyl, alkenyl, aryl, aralkyl, furfuryl, pyridyl, or picolyl group; and $R_3$ stands for hydrogen atom or alkyl group, one of two $CH_2OCONR_2R_3$ groups is present in the 2-position and the other in the 5- or 6-position, and process for the manufacture of them.

The above bis(hydroxymethyl)pyridine dicarbamate and dithioncarbamate derivatives are useful in the treatment of inflammatory diseases including rheumatic disorders such as rheumatoid arthritis.

The above bis(hydroxymethyl)pyridine dicarbamate and dithioncarbamate derivatives are manufactured by reacting bis(hydroxymethyl)pyridine represented by the following general formula:

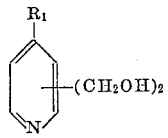

wherein $R_1$ has the meanings as described hereinbefore, one of two $CH_2OH$ groups is presented in the 2-position and the other in the 5- or 6-position, or their derivatives in which the substituent is present in the 4-position, with compounds represented by the following formula:

$$R_2NCO \text{ or } R_2NCS$$

(II)

or with compounds represented by the following formula:

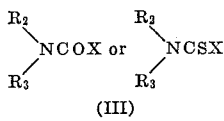

(III)

or with phosgene or thiophosgene and then ammonia or amines represented by the formula:

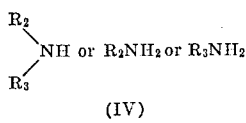

(IV)

wherein the above $R_2$ and $R_3$ have the meanings as described hereinbefore, and X stands for halogen atom, alkoxyl or phenoxy group.

The compounds which are obtained by the process of the present invention are useful in the treatment of inflammatory diseases including rheumatic disorders such as rheumatoid arthritis and also useful in the treatment of the hypersecretion of secretory glands such as sweat gland.

In one embodiment of the present invention, the compound of the Formula I is reacted with the compounds of the Formula II in a solvent or diluent. The suitable solvents or diluents are benzene, toluene, chlorobenzene, acetonitrile, chloroform, tetrahydrofuran, and pyridine. The reaction is preferably carried out at a temperature of from room temperature to 150° C., especially at about the boiling point of the solvent or diluent. If necessary, a catalyst such as tertiary amine, for example, trimethylamine, triethylamine, N-alkylpiperidine, and pyridine or metal alkoxides such as potassium tert-butoxide may be used in the reaction. In place of the isocyanate or isothiocyanate of the Formula II, compounds which can be converted to the isocyanate or isothiocyanate of the Formula II under the reaction conditions can be used. For example, acyl azides represented by the formula: $R_2CON_3$ under heating, or S-alkyl thiolcarbamates or S-alkyl dithiocarbamates represented by the formula: $R_2NHCOS$-alkyl or $R_2NHCSS$-alkyl under heating, or S-alkyl thiolcarbamates or S-alkyl dithiolcarbamates in the presence of trialkylamine and heavy metal salt such as siver nitrate.

In other embodiment of the present invention, the compound of the Formula I is reacted with the functional derivatives of carboxylic acid represented by the Formula III. When the functional derivative is an acyl chloride, the reaction is carried out in a solvent or diluent, such as, benzene, toluene, chlorobenzene, diethyl ether, diisopropyl ether, pyridine, and chloroform. The other reaction conditions are similar to that described above.

On the other hand, when the functional derivative is an ester of acid, it is necessary to use a catalyst in the reaction system. As a catalyst, sulfuric acid, toluenesulfonic acid, trifluoro acetic acid and its anhydride metal alkoxides, for example, aluminum isopropoxide and potassium tert-butoxide are preferable. As a solvent or diluent, benzene, toluene, chlorobenzene, tetrahydrofuran are suitable. The reaction is carried out at a temperature of about the boiling point of the solvent or diluent, and slow distillation of the solvent or diluent from the reaction system while the reaction proceeds, improves the yield of the objective product.

In further embodiment of the present invention, the compound of the Formula I is dissolved or suspended in a solvent or diluent, such as, benzene, toluene, chlorobenzene, diethyl ether, diisopropyl ether, and chloroform. The solution or suspension is preferably added with tertiary amine, for example, dimethylaniline, diethylaniline, or the above-mentioned tertiary amine as a catalyst or dehydrochlorinating agent and then added with phosgene or thiophosgene and thereafter added with ammonia, monoalkylamine, or dialkylamine to effect the reaction. The reaction is effected at a room temperature or lower, particularly below 10° C.

The product is separated and purified by a conventional procedure.

Relating to the compounds of the Formula I 2,6-bis-(hydroxymethyl)pyridine had been manufactured by reacting the diester of dipicolinic acid with lithium aluminum hydride, but its yield was only 2%.

As a result of our investigations on this point, we have now found that the compounds of the Formula I can be manufactured by reacting the derivatives of pyridine-dicarboxylic acid represented by the general formula: (wherein $R_1$ has the meanings as described hereinbefore and one of two COOH groups is present in the 2-position and other in the 5- or 6-position) with alkali metal borohydride.

As the functional derivatives of carboxylic acid used in this case, specially superior one is dimethyl ester, diethyl ester, or diacid chloride. As the alkali in the alkali metal borohydride, sodium, potassium, and lithium are suitable. The reaction is carried out in the presence of a solvent, such as, methanol, ethanol, dioxane and diethyleneglycol dimethyl ether and the solvent may contain water. The reaction is preferably carried out at a temperature of 50° to 100° C., particularly at about boiling point of the solvent. In the reaction, the yield can be increased by adding ammonia, trimethylamine, or triethylamine in the reaction system. In the case of free carboxylic acid, it is necessary to use diethyleneglycol dimethyl ether as a solvent and alkali metal borohydride in the presence of anhydrous aluminum trichloride.

The present invention is illustrated but not limited by the following examples in which the parts used are parts by weight. In examples, all the ultraviolet spectra were measured in 95% ethanol solution, and in the infrared spectra, absorption maxima are shown in wave number (cm.$^{-1}$), but absorption peaks appearing in the range of 3000–2900 cm.$^{-1}$(CH stretching vibration) were omitted.

EXAMPLE 1

To the solution of 4.5 parts of sodium borohydride in 40 parts by volume of methanol, 5.5 parts of diethyl pyridine-2,6-dicarboxylate was added under cooling and stirring. The reaction mixture was boiled under reflux for 10 hours. The resultant solution was added with 20 parts by volume of acetone and the solvent was distilled off. The residue was added with 10 parts by volume of 10% aqueous potassium carbonate solution and the resulting solution was evaporated to dryness under a reduced pressure, the residue was extracted with chloroform or ethyl acetate. The extract was recrystallized from methanol to obtain 2.5 parts of 2,6-bis(hydroxymethyl)pyridine having the melting point of 113° C.

Ultraviolet spectrum: $\lambda_{max.}$ 264 m$\mu$, 271 m$\mu$(shoulder).
Infrared spectrum:

$\gamma_{max.}^{KBr}$ 3350, 1600, 1575, 1470, 1410, 1385, 1223, 1160, 1105, 1083, 1025, 1020, 978, 820, 768

5.5 parts of 2,6-bis(hydroxymethyl)pyridine thus obtained and 7 parts of methyl isocyanate were added to 50 parts by volume of pyridine, the mixture was left to stand at room temperature for 12 hours, and then was heated and boiled at the temperature of 120° C. under reflux for 3 hours. Pyridine was distilled off under a reduced pressure and the residue was recrystallized from methanol to obtain 10 parts of 2,6-bis(hydroxymethyl)pyridine di-(N-methylcarbamate) having the melting point of 136° C.

*Analysis of elements.*—Calculated (percent): C, 52.17; H, 5.97; N, 16.59. Found (percent): C, 53.47; H, 6.01; N, 15.95.

Ultraviolet spectrum: $\lambda_{max.}$ 265 m$\mu$($\epsilon$=4,700), 271 m$\mu$(shoulder).
Infrared spectrum:

$\gamma_{max.}^{CHCl_3}$ 3485, 1725, 1600, 1580, 1460, 1420, 1380, 1335, 1140, 1110, 1025, 990

Melting point of hydrochloride: 182° C. This substance is administered by mouth in a dose of 5 to 30 mg. per kg. a day. In adults 0.3 mg., 0.5 mg. or 1 mg. of this substance is commonly used once or twice a day and the most common usage in adults is one gram of this substance once a day and in children it is 30 mg. per kg. once a day. A long term treatment with this substance is possible and there was found no appreciable untoward effects. The effect is rapid and almost twelve hours after the administration of this substance, the edematous swelling, heat and redness of joints or petechiae in rheumatic disorders disappear and the morning stiffness seen in rheumatoid arthritis shows a definite improvement. The daily administration gives a favorable effect on the course of rheumatic disorders.

EXAMPLES 2 to 10

Example 1 was repeated except that 2,6-bis(hydroxymethyl)pyridine was reacted with the following isocyanates. The following products were obtained in a similar yield with Example 1.

EXAMPLE 2

Isocyanate: Ethyl isocyanate
Product: 2,6-bis(hydroxymethyl)pyridine di-(N-ethylcarbamate)
Melting point: 126° C.

*Analysis of elements.*—Calculated (percent): C, 55.50; H, 6.81; N, 14.94. Found (percent): C, 55.30; H, 6.80; N, 14.65.

Ultraviolet spectrum: $\lambda_{max.}$ 265 m$\mu$($\epsilon$=4730), 271 m$\mu$(shoulder).
Infrared spectrum:

$\gamma_{max.}^{CHCl_3}$ 3460, 1725, 1600, 1580, 1515, 1460, 1390, 1360, 1335, 1160, 1140, 1085, 1040, 925

EXAMPLE 3

Isocyanate: Isopropyl isocyanate
Product: 2,6-bis(hydroxymethyl)pyridine di-(N-isopropylcarbamate)
Melting point: 132° C.

*Analysis of elements.*—Calculated (percent): C, 58.23; H, 7.49; N, 13.58. Found (percent): C, 58.55; H, 7.63; N, 13.55.

Infrared spectrum:

$\gamma_{max.}^{CHCl_3}$ 3430, 1725, 1600, 1505, 1460, 1390, 1375, 1322, 1090, 925

EXAMPLE 4

Isocyanate: Sec-butyl isocyanate
Product: 2,6-bis(hydroxymethyl)pyridine di-(N-sec-butylcarbamate)
Melting point: 113° C.

*Analysis of elements.*—Calculated (percent): C, 60.51; H, 8.07; N, 12.45. Found (percent): C, 60.83; H, 7.90; N, 12.46.

Infrared spectrum:

$\gamma_{max.}^{CHCl_3}$ 3420, 1720, 1590, 1505, 1460, 1140, 1032, 925

EXAMPLE 5

Isocyanate: Allyl isocyanate
Product: 2,6-bis(hydroxymethyl)pyridine di-(N-allylcarbamate)
Melting point: 76° C.

*Analysis of elements.*—Calculated (percent): C, 59.00; H, 6.27; N, 13.76. Found (percent): C, 58.85; H, 6.32; N, 14.01.
Infrared spectrum:

$\gamma_{max.}^{CHCl_3}$ 3420, 1720, 1590, 1505, 1465, 1150, 1130, 1073, 1035, 987, 925

EXAMPLE 6

Isocyanate: Phenyl isocyanate
Product: 2,6-bis(hydroxymethyl)pyridine di-(N-phenylcarbamate)
Melting point: 154° C.

*Analysis of elements.*—Calculated (percent): C, 66.83; H, 5.07; N, 11.14. Found (percent): C, 66.40; H, 5.13; N, 11.15.

Infrared spectrum:

$\gamma_{max.}^{KBr}$ 3403, 1740, 1600, 1523, 1443, 1360, 1340, 1320, 1260, 1190, 1073

Similarly, the following product was obtained by using 2,5-bis(hydroxymethyl)pyridine.

EXAMPLE 7

Isocyanate: Methyl isocyanate
Product: 2,5-bis(hydroxymethyl)pyridine di-(N-methylcarbamate)
Melting point: 129° C.

*Analysis of elements.*—Calculated (percent): C, 52.17; H, 5.97; N, 16.59. Found (percent): C, 52.48; H, 6.36; N, 16.74.

Infrared spectrum:

$\gamma_{max.}^{CHCl_3}$ 3480, 1725, 1605, 1520, 1460, 1420, 1370, 1340, 1240, 1135, 1100, 990, 940, 895, 835

Similarly, the following products were obtained by using derivatives of 2,6-bis(hydroxymethyl)pyridine having a substituent at the 4-position.

EXAMPLE 8

Isocyanate: Methyl isocyanate
Product: 4-methoxy-2,6-bis(hydroxymethyl)-pyridine di-(N-methylcarbamate)
Melting point: 164° C.

*Analysis of elements.*—Calculated (percent): C, 50.88; H, 6.05; N, 14.83. Found (percent): C, 51.35; H, 6.02; N, 14.84.

Ultraviolet spectrum: $\lambda_{max.}$ 220 m$\mu$($\epsilon$=7,550), 257 m$\mu$(inflect.), 265 m$\mu$(inflect.).

Infrared spectrum:

$\gamma_{max.}^{CHCl_3}$ 3470, 1725, 1603, 1580, 1510, 1470, 1425, 1385, 1340, 1135, 1062, 1035, 990

EXAMPLE 9

Isocyanate: Methyl isocyanate
Product: 4-methylthio-2,6-bis(hydroxmethyl)-pyridine di-(N-methylcarbamate)
Melting point: 154° C.

*Analysis of elements.*—Calculated (percent): C, 48.20; H, 5.69; N, 14.05. Found (percent): C, 48.63; H, 5.92; N, 14.55.

Ultraviolet spectrum: $\lambda_{max.}$ 223.5 m$\mu$($\epsilon$=12,100), 267 m$\mu$($\epsilon$=13,000).

Infrared spectrum:

$\gamma_{max.}^{CHCl_3}$ 3420, 1720, 1615, 1590, 1505, 1420, 1380, 1330, 1135, 1038, 990, 925, 848

EXAMPLE 10

Isocyanate: Methyl isocyanate
Product: 4-ethylsulfonyl-2,6-bis(hydroxymethyl) pyridine di-(N-methylcarbamate)
Melting point: 173° C.

*Analysis of elements.*—Calculated (percent): C, 45.21; H, 5.55; N, 12.17. Found (percent): C, 45.63; H, 5.34; N, 12.56.

Ultraviolet spectrum: $\lambda_{max.}$ 232 m$\mu$($\epsilon$=15,000), 281 m$\mu$($\epsilon$=10,900).

Infrared spectrum:

$\gamma_{max.}^{KBr}$ 3420, 1710, 1537, 1410, 1325, 1268, 1142, 1091, 1049, 941, 903, 782, 745, 715

EXAMPLE 11

1.2 parts of sodium borohydride was dissolved in a mixture of 8 parts by volume of 50% water-containing methanol and 2 parts by volume of 28% aqueous ammonia. To the solution was added 1 part of diethyl 4-ethoxy pyridine-2,6-dicarboxylate in small portions under cooling and stirring. The resultant reaction mixture was boiled under reflux on a water bath for 9 hours. By the treatment as in Example 1, 0.5 part of 4-ethoxy-2,6-bis(hydroxymethyl)pyridine having the melting point of 125° C. was obtained.

*Analysis of elements.*—Calculated (percent): C, 59.00; H, 7.15; N, 7.65. Found (percent): C, 58.78; H, 7.23; N, 8.12.

Ultraviolet spectrum: $\lambda_{max.}$ 220 m$\mu$($\epsilon$=8,000), 256 m$\mu$(inflect.), 265 m$\mu$(inflect.).

Infrared spectrum:

$\gamma_{max.}^{KBr}$ 3350 (broad), 1600, 1590, 1452, 1380, 1320, 1160, 1113, 1093, 1060, 1038, 998, 975, 878, 865, 852

The compound thus obtained was reacted with methyl isocyanate as in Example 1 to obtain 4-ethoxy-2,6-bis(hydroxymethyl)pyridine di-(N-methylcarbamate) in a similar yield as in Example 1.
Melting point: 167° C.

*Analysis of elements.*—Calculated (percent): C, 52.51; H, 6.44; N, 14.13. Found (percent): C, 52.85; H, 6.51; N, 14.08.

Ultraviolet spectrum: $\lambda_{max.}$ 221.5 M$\mu$($\epsilon$=7,550), 257 m$\mu$(inflect.), 265 m$\mu$(inflect.).

Infrared spectrum:

$\gamma_{max.}^{CHCl_3}$ 3480, 1725, 1603, 1580, 1510, 1460, 1420, 1385, 1365, 1330, 1168, 1138, 1110, 1060, 1040, 990

EXAMPLE 12

In a similar manner and yield as in Example 1, 4-chloro-2,6-bis(hydroxymethyl)pyridine was produced from diethyl 4-chloro-pyridine-2,6-dicarboxylate.
Melting point: 142° C.

Ultraviolet spectrum: $\lambda_{max.}$ 266 m$\mu$($\epsilon$=4,020), 273 m$\mu$($\epsilon$=3,500).

Infrared spectrum:

$\gamma_{max.}^{KBr}$ 3350, 1580, 1565, 1410, 1335, 1305, 1270, 1108, 1030, 1010, 980, 863

The obtained 4-chloro-2,6-bis(hydroxymethyl)pyridine was reacted with methyl isocyanate as in Example 1 to obtain 4-chloro-2,6-bis(hydroxymethyl)pyridine di-(N-methylcarbamate) having the melting point of 123° C. in a similar yield.

*Analysis of elements.*—Calculated (percent): C, 45.87; H, 4.90; N, 14.59. Found (percent): C, 46.28; H, 4.88; N, 14.72.

Ultraviolet spectrum: $\lambda_{max.}$ 264.5 m$\mu$($\epsilon$=3,440), 272 m$\mu$($\epsilon$=3,250).

Infrared spectrum:

$\gamma_{max.}^{CHCl_3}$ 3480, 1725, 1620, 1580, 1560, 1510, 1460, 1420, 1335, 1140, 1040, 925, 855

EXAMPLE 13

In a similar manner and yield as in Example 1, 4-ethylthio-2,6-bis(hydroxymethyl)pyridine was produced from diethyl 4-ethylthiopyridine-2,6-dicarboxylate.
Melting point: 102° C.

Ultraviolet spectrum: $\lambda_{max.}$ 224 m$\mu$($\epsilon$=12,000), 269 m$\mu$($\epsilon$=13,500).

Infrared spectrum:

$\gamma_{max.}^{CHCl_3}$ 3360 (broad), 1575, 1530, 1440, 1370, 1260, 1105, 1050, 835

Thus obtained 4-ethylthio-2,6-bis(hydroxymethyl)pyridine was reacted with methyl isocyanate as in Example 1 to obtain 4-ethylthio-2,6-bis(hydroxymethyl)pyridine di(N-methylcarbamate) having the melting point of 118° C. in a similar yield.

*Analysis of elements.*—Calculated (percent): C, 49.88; H, 6.12; N, 13.43. Found (percent): C, 50.28; H, 6.04; N, 13.62.

Ultraviolet spectrum: $\lambda_{max.}$ 224 m$\mu$($\epsilon$=11,700), 269 m$\mu$($\epsilon$=13,400).

Infrared spectrum:

$\gamma_{max.}^{CHCl_3}$ 3420, 1720, 1610, 1580, 1505, 1410, 1138, 1035, 920, 848

EXAMPLE 14

In a similar manner and yield as in Example 1, 4-phenylthio-2,6-bis(hydroxymethyl)pyridine was produced from diethyl 4-phenylthio pyridine-2,6-dicarboxylate.

Melting point: 142° C.
Ultraviolet spectrum: $\lambda_{max}$ 266 m$\mu$.
Infrared spectrum:

$\gamma_{max.}^{KBr}$ 3370, 1578, 1540, 1440, 1400, 1270, 1060, 995, 925, 850

Thus obtained 4-phenylthio-2,6-bis(hydroxymethyl)pyridine was reacted with methyl isocyanate as in Example 1 to obtain 4-phenylthio-2,6-bis(hydroxymethyl)pyridine di(N-methylcarbamate) having the melting point of 127° C. in similar yield.

*Analysis of elements.*—Calculated (percent): C, 56.50; H, 5.30; N, 11.63. Found (percent): C, 56.27; H, 5.43; N, 11.21.
Ultraviolet spectrum: $\lambda_{max.}$ 266 m$\mu$ ($\epsilon$=12,110).
Infrared spectrum:

$\gamma_{max.}^{CHCl_3}$ 3430, 1720, 1582, 1520, 1420, 1338, 1143, 1040, 980, 925, 850

EXAMPLE 15

In a similar manner and yield as in Example 10, 4-dimethylamino-2,6-bis(hydroxymethyl)pyridine was produced from dimethyl 4-dimethylamino pyridine-2,6-dicarboxylate.

Melting point: 171° C.
Infrared spectrum:

$\gamma_{max.}^{KBr}$ 3300, 1603, 1370, 1332, 1312, 1180, 1148, 1080, 1060, 1020, 978, 925, 870, 844

Thus obtained 4-dimethylamino-2,6-bis(hydroxymethyl)-pyridine was reacted with methyl isocyanate as in Example 1 to obtain 4-dimethylamino-2,6-bis(hydroxymethyl)pyridine di-(N-methylcarbamate) having the melting point of 174° C. in a similar yield.

*Analysis of elements.*—Calculated (percent): C, 52.69; H, 6.80; N, 18.91. Found (percent): C, 52.35; H, 6.71; N, 20.35.
Infrared spectrum:

$\gamma_{max.}^{CHCl_3}$ 3450, 1720, 1603, 1580, 1520, 1470, 1422, 1380, 1140, 1065, 1040, 925

EXAMPLES 16 AND 17

1.3 parts of 2,6-bis(hydroxymethyl)pyridine, 5.9 parts of S-methyl N-benzylthiolcarbamate and 3 parts of triethylamine were dissolved in a mixed solution of 7 parts by volume of pyridine and 3 parts by volume of acetonitrile. To the solution was added a solution of 5.1 parts of silver nitrate in 5 parts by volume of acetonitrile under cooling and stirring. After the completion of the addition the solution was left to stand for 12 hours and then heated at the temperature of 100° C. for 3 hours. After cooling, the reaction solution was diluted with chloroform and the precipitation was filtered off. The filtrate was washed with water, dried and was distilled under a reduced pressure to remove the solvent. The obtained residue was recrystallized from methanol to obtain 2.5 parts of 2,6-bis(hydroxymethyl)pyridine di-(N-benzylcarbamate) having the melting point of 136° C.

*Analysis of elements.*—Calculated (percent): C, 68.13; H, 5.72; N, 10.37. Found (percent): C, 68.18; H, 5.81; N, 10.45.
Infrared spectrum:

$\gamma_{max.}^{CHCl_3}$ 3430, 1725, 1600, 1510, 1460, 1330, 1135, 1045, 925, 875, 848

Similarly, 2,6-bis(hydroxymethyl)pyridine was reacted with S-ethyl N-($\beta$-picolyl)-thiolcarbamate to obtain 2,6-bis(hydroxymethyl)pyridine di - (N-$\beta$-picolylcarbamate) having the melting point of 110° C.

*Analysis of elements.*—Calculated (percent): C, 61.90; H, 5.20; N, 17.19. Found (percent): C, 62.39; H, 5.26; N, 17.24.
Infrared spectrum:

$\gamma_{max.}^{CHCl_3}$ 3480, 1725, 1600, 1580, 1510, 1460, 1430, 1400, 1365, 1335, 1140, 1100, 1050, 1030, 990

EXAMPLE 18

A solution of 1.3 parts of 2,6-bis(hydroxymethyl)pyridine, 6.5 parts of S-methyl (N-2-furfuryl)-thiolcarbamate in 10 parts by volume of pyridine was refluxed at a temperature of 130° C. for 15 hours. Then the solvent was distilled off under a reduced pressure, the resultant residue was recrystallized from benzene to obtain 1.5 parts of 2,6-bis(hydroxymethyl)pyridine di-(N - 2 - furfurylcarbamate) having the melting point of 92° C.

*Analysis of elements.*—Calculated (percent): C, 64.58; H, 5.42; N, 11.89. Found (percent): C, 63.17; H, 5.24; N, 11.87.
Infrared spectrum:

$\gamma_{max.}^{CHCl_3}$ 3420, 1720, 1590, 1570, 1505, 1465, 1350, 1322, 1145, 1130, 1078, 1040, 1010, 921, 883

EXAMPLE 19

2.3 parts of 2,6-bis(hydroxymethyl)pyridine and 5.4 parts of nicotinic acid azide was dissolved in 45 parts by volume of pyridine. The temperature of the reaction mixture was raised to 100° C. and was maintained at this temperature for 40 minutes. Then the reaction mixture was refluxed at 125° C. for 10 hours. Pyridine was distilled off from the reaction mixture and the resulting residue was treated with methylenechloride to yield 5.0 parts of raw crystalline product. The crystal was recrystallized from methanol to give 2.5 parts of 2,6-bis-(hydroxymethyl)pyridine di-(N - $\beta$ - pyridylcarbamate) melting at 170° C.

*Analysis of elements.*—Calculated (percent): C, 60.15; H, 4.52; N, 18.46; Found (percent): C, 59.68; H, 4.94; N, 18.17.
Ultraviolet spectrum: $\lambda_{max.}$ 236 m$\mu$ ($\epsilon$=21,900), 266 m$\mu$ ($\epsilon$=6,000), 272 m$\mu$ ($\epsilon$=6,200), 280 m$\mu$ ($\epsilon$=4,650).
Infrared spectrum:

$\gamma_{max.}^{KBr}$ 3220, 3190, 1735, 1614, 1555, 1485, 1450, 1420, 1330, 1305, 1230, 1130, 1105, 1090, 1045, 804, 775, 765, 707

EXAMPLES 20 AND 21

To a solution of 5 parts of 2,6-bis(hydroxymethyl)pyridine in 50 parts by volume of pyridine was added 12 parts of N-methyl carbamylchloride. The mixture was left to stand at room temperature for 12 hours and was heated to the temperature of 120° C. and then boiled under reflux for 3 hours. The reaction solution was distilled under a reduced pressure to remove pyridine and the residue was added with water and thereafter was made alkaline with aqueous sodium carbonate solution and was extracted with chloroform. The residue was recrystallized from methanol to obtain 8.2 parts of a crystalline product having the melting point of 134° C. It was identified with 2,6-bis(hydroxymethyl)pyridine di-(N-methylcarbamate) obtained in Example 1 through mixed melting point and comparison of their infrared spectra.

Similarly, 2,6-bis(hydroxymethyl)pyridine was reacted with N-dimethyl carbamylchloride to obtain 2,6-bis(hydroxymethyl)pyridine di-(N-dimethylcarbamate) having the melting point of 101° C. in a similar yield.

*Analysis of elements.*—Calculated (percent): C, 55.50; H, 6.81; N, 14.94. Found (percent): C, 55.14; H, 6.89; N, 15.03.

Infrared spectrum:

$\gamma_{max.}^{CHCl_3}$ 1708, 1600, 1580, 1500, 1460, 1403, 1355, 1195, 1055, 975, 925, 850

EXAMPLE 22

5 parts of 2,6-bis(hydroxymethyl)pyridine was reacted with 12 parts of N-diethyl carbamylchloride in a similar procedure as in Example 20. From the reaction solution pyridine was distilled out and the residue was made alkaline with aqueous sodium carbonate solution and was extracted with ether. Ether was distilled out from the extract and the remaining oily substance was hydrochlorinated with hydrochloric acid. The hydrochloride salt was recrystallized from benzene to obtain 7.8 parts of 2,6-bis(hydroxymethyl)pyridine di - (N-diethylcarbamate) ·HCl having the melting point of 128° C.

Analysis of elements.—Calculated (percent): C, 54.20; H, 7.91; N, 11.15. Found (percent): C, 54.53; H, 8.04; N, 11.47.

Infrared spectrum:

$\gamma_{max.}^{KBr}$ 3500 (broad), 2430, 1935, 1700, 1680, 1620, 1515, 1480, 1430, 1382, 1318, 1280, 1225, 1188, 1170, 1095, 1089, 1170, 1015, 970, 940, 821, 808, 775

EXAMPLE 23

A solution of 10 parts of 2,6-bis(hydroxymethyl)pyridine, 23 parts of ethyl N-pentamethylenecarbamate, and 2 parts of potassium tert-butoxide in 500 parts by volume of toluene was heated at around 130° C. While the reaction proceeds, the solvent was gradually distilled out from the reaction system. After 10 hours, the volume of the reaction mixture was reduced to one fifth of the original one. Then the residue was washed with water, dried, and the remaining solvent was distilled off. The resultant residue was recrystallized from a mixture of benzene and hexane to obtain 4.6 parts of 2,6-bis(hydroxymethyl)pyridine di-(N-pentamethylenecarbamate) having the melting point of 97° C.

Analysis of elements.—Calculated (percent): C, 63.14; H, 7.53; N, 11.63. Found (percent): C, 63.03; H, 7.55; N, 11.53.

Infrared spectrum:

$\gamma_{max.}^{KBr}$ 1680, 1600, 1470, 1440, 1350, 1270, 1235, 1157, 1102, 1040, 1033, 1023, 975, 909, 815, 801, 771

EXAMPLE 24

To a solution of 6 parts of 2,6-bis(hydroxymethyl)pyridine and 12 parts of dimethylaniline in 700 parts by volume of toluene, was introduced 10 parts of phosgene at a temperature of −5° C. The reaction mixture was left to stand for 12 hours at 0° C., then the precipitated dimethylaniline hydrochloride was filtered off and the filtrate was added with 15 parts of diethylamine under cooling. The mixture was shook for several hours in cold, then the toluene layer was separated, dried and distilled under a reduced pressure. The resultant residue was hydrochlorinated with dilute hydrochloric acid and was crystallized from benzene to obtain 3.6 parts of a crystal having the melting point of 128° C. It was identified with 2,6-bis(hydroxymethyl)pyridine di-(N-diethylcarbamate) ·HCl obtained in Example 22 through mixed melting point and comparison of their infrared spectra.

EXAMPLE 25

In a similar procedure and yield, 2,6-bis(hydroxymethyl)pyridine was reacted with phosgene, thereafter with cyclohexylamine to obtain 2,6-bis(hydroxymethyl) pyridine di-(N-cyclohexylcarbamate) having the melting point of 157° C.

Analysis of elements.—Calculated (percent): C, 64.76; H, 8.02; N, 10.79. Found (percent): C, 65.85; H, 8.06; N, 10.96.

Infrared spectrum:

$\gamma_{max.}^{KBr}$ 3300, 1678, 1600, 1540, 1450, 1310, 1275, 1250, 1232, 1150, 1070, 895, 785

EXAMPLE 26

To a solution of potassium t-butoxide prepared from 6.3 grams of potassium and 120 ml. t-butyl alcohol was added 10 grams of 2,6-bis(hydroxymethyl)pyridine. After stirring for 15 minutes 11 grams of methyl isothiocyanate was added. The resulting solution was stirred under nitrogen for 3.5 hours at room temperature after which 50 ml. water was added together with enough hydrochloric acid to neutralize the mixture. After removal of most of the water and t-butyl alcohol under reduced pressure, the residue was extracted with ether. The ether extract was recrystallized from benzene to obtain 14 grams of 2,6-bis(hydroxymethyl)pyridine di - (N - methylthionocarbamate) having the melting point of 124° C.

Analysis of elements.—Calculated (percent): C, 46.31; H, 5.30; N, 14.73. Found (percent): C, 46.48; H, 5.43; N, 14.95.

Infrared spectrum:

$\gamma_{max.}^{CHCl_3}$ 3390, 1600, 1580, 1520, 1442, 1370, 1230, 1192, 1160, 1140, 1069, 1020, 995, 925

EXAMPLES 27 TO 29

In a similar procedure and yield as in Example 26, the following products were obtained.

EXAMPLE 27

2,6-bis(hydroxymethyl)pyridine was reacted with ethyl isothiocyanate to obtain 2,6-bis(hydroxymethyl)pyridine di-(N-ethylthionocarbamate) having the melting point of 78° C. recrystallized from ether-hexane.

Analysis of elements.—Calculated (percent): C, 49.83; H, 6.11; N, 13.41. Found (percent): C, 50.17; H, 6.03; N, 13.70.

Infrared spectrum:

$\gamma_{max.}^{CHCl_3}$ 3400, 1600, 1580, 1518, 1450, 1403, 1340, 1302, 1182, 1150, 1090, 1060, 1030, 1055, 930

EXAMPLE 28

Similarly, 2,6-bis(hydroxymethyl)pyridine was reacted with phenyl isothiocyanate to obtain 2,6-bis(hydroxymethyl)pyridine di-(N-phenylthionocarbamate) having the melting point of 121–123° C. recrystallized from benzene.

Analysis of elements.—Calculated (percent): C, 61.61; H, 4.68; N, 10.27. Found (percent): C, 60.23; H, 4.95; N, 10.61.

Infrared spectrum:

$\gamma_{max.}^{CHCl_3}$ 3410, 1600, 1590, 1520, 1453, 1390, 1340, 1160, 1150, 1085, 1055, 1025, 925

EXAMPLE 29

Similarly, 4-ethoxy - 2,6 - bis(hydroxymethyl)pyridine was reacted with ethyl isothiocyanate to obtain 4-ethoxy-2,6 - bis(hydroxymethyl)pyridine di-(N-ethylthionocarbamate) having the melting point of 106° C. recrystallized from diethylether di-isopropylether.

Analysis of elements.—Calculated (percent): C, 50.41; H, 6.49; N, 11.76. Found (percent): C, 50.64; H, 6.43; N, 11.45.

Infrared spectrum:

$\gamma_{max.}^{CHCl_3}$ 3400, 1603, 1572, 1518, 1453, 1403, 1385, 1340, 1180, 1150, 1092, 1056, 926

EXAMPLE 30

To a solution of 13 grams of 2,6-bis(hydroxymethyl)-pyridine in 100 ml. pyridine was added 32 grams of diethyl thiocorbamoyl chloride. The solution was allowed to stand for 12 hours at room temperature, then was heated at 80° C. for 5 hours. The resulting solution was concentrated under reduced pressure. To the residue was added aqueous sodium carbonate solution and it was extracted with ether. The ether extract was filtered through a column packed with alumina. An oily substance obtained from the filtrate was hydrochlorinated with hydrochloric acid and crystallized from methanol-ether to obtain 12 grams of 2,6-bis(hydroxymethyl)pyridine di-(N-diethylthionocarbamate) hydrochloride having the melting point of 137–140° C.

Infrared spectrum:

$\gamma_{max.}^{CHCl_3}$ 3390, 1640, 1515, 1430, 1385, 1370, 1320, 1290. 1220, 1164, 1138, 1095, 1080, 1045, 995, 930

EXAMPLE 31

In the procedure of Example 1 the methyl isocyanate used therein (calculating parts as grams) is replaced by an equimolar weight of allyl isothiocyanate, phenyl isocyanate, phenylisothiocyanate, p-tolyl isocyanate, ethyl isothiocyanate, methyl isothiocyanate, m-tolyl isocyanate, o-tolyl isocyanate, p-ethoxyphenyl isocyanate, p-bromophenyl isocyanate, o-chlorophenyl isocyanate, m-chlorophenyl isocyanate, p-chlorophenyl isocyanate, n-heptyl isothiocyanate, n-butyl isothiocyanate, 2,5-dichlorophenyl isocyanate, o-ethoxyphenyl isocyanate, o-nitrophenyl isocyanate, m-nitrophenyl isocyanate, o-methoxyphenyl isocyanate, p-methoxyphenyl isocyanate, ethyl isocyanate, n-butyl isocyanate and octyl isocyanate, respectively, to produce 2,6 - bis(hydroxymethyl)pyridine di - (N-allylthiocarbamate),
2,6-bis(hydroxymethyl)pyridine di-(N-phenylcarbamate),
2,6 - bis(hydroxymethyl)pyridine di-(N-phenylthiocarbamate),
2,6-bis(hydroxymethyl)pyridine di-(N-p-tolylcarbamate),
2,6 - bis(hydroxymethyl)pyridine di-(N - ethylthiocarbamate),
2, 6 -bis(hydroxymethyl)pyridine di-(N-methylthiocarbamate),
2,6-bis(hydroxymethyl)pyridine di-(N-m-tolylcarbamate),
2,6-bis(hydroxymethyl)pyridine di-(N-o-tolylcarbamate),
2,6 - bis(hydroxymethyl)pyridine di-(N-p-ethoxyphenylcarbamate),
2,6 - bis(hydroxymethyl)pyridine di-(N-p-bromophenylcarbamate),
2,6 - bis(hydroxymethyl)pyridine di-(N-o-chlorophenylcarbamate),
2,6 - bis(hydroxymethyl)pyridine di-(N-m-chlorophenylcarbamate),
2,6 - bis(hydroxymethyl)pyridine di-(N-p-chlorophenylcarbamate),
2,6 - bis(hydroxymethyl)pyridine di-(N-heptylthiocarbamate),
2,6 - bis(hydroxymethyl)pyridine di-(N-n-butylthiocarbamate),
2,6 - bis(hydroxymethyl)pyridine di(N - 2',5' - dichlorophenylcarbamate),
2,6 - bis(hydroxymethyl)pyridine di-(N-o-ethoxyphenylcarbamate),
2,6 - bis(hydroxymethyl)pyridine di-(N-o-nitrophenylcarbamate),
2,6-bis(hydroxymethyl)pyridine di-(N-m-nitrophenylcarbamate),
2,6-bis(hydroxymethyl)pyridine di-(N-o-methoxyphenylcarbamate),
2,6-bis(hydroxymethyl)pyridine di-(N-p-methoxyphenylcarbamate),
2,6-bis(hydroxymethyl)pyridine di(N-ethylcarbamate),
2,6 - bis(hydroxymethyl)pyridine di(N-n-butylcarbamate) and
2,6-bis(hydroxymethyl)pyridine di-(N-octylcarbamate), respectively, which are active anti-inflammatory agents which form salts with strong acids, e.g. citric acid.

EXAMPLE 32

In the procedure of Example 1, the methyl isocyanate used therein (calculating parts as grams) is replaced by one-half an equimolar weight of methyl isothiocyanate, ethyl isothiocyanate and n-hexyl isothiocyanate, respectively, to produce the corresponding mono-thiocarbamate which is then isolated and reacted with about one equivalent of methyl isocyanate to produce 2,6-bis(hydroxymethyl)pyridine N-methylcarbamate N'-methylthiocarbamate,
2,6-bis(hydroxymethyl)pyridine N-methylcarbamate N'-ethylthiocarbamate and
2,6-bis(hydroxymethyl)pyridine N-methylcarbamate N'-n-hexylthiocarbamate, respectively, which are active anti-inflammatory agents which form relatively water-soluble salts with hydrochloric acid.

EXAMPLE 33

In the procedure of Example 24 (reading parts as grams) the diethylamine used therein is replaced by four grams anhydrous ammonia to produce 2,6-bis(hydroxymethyl)-pyridine dicarbamate.

EXAMPLE 34

In the procedure of Example 24 (reading parts as grams) the phosgene used therein is replaced by an equimolar weight of thiophosgene to produce 2,6-bis-(hydroxymethyl)pyridine di-(N-diethylthiocarbamate).

EXAMPLE 35

In the procedure of Example 20 (reading parts as grams) the N-methyl carbamyl chloride is replaced by an equimolar weight of N-2-picolyl-carbamyl chloride, N-2'-methyl-3-pyridyl-carbamyl chloride and N-2-pyrrolylcarbamyl chloride, respectively, to produce 2,6-bis(hydroxymethyl)pyridine di-(N-2'-picolylcarbamate),
2,6-bis(hydroxymethyl)pyridine di-(N-2''-methyl-3'-pyridylcarbamate) and
2,6-bis(hydroxymethyl)pyridine di-(N-2'-pyrrolylcarbamate), respectively.

EXAMPLE 36

Compounds corresponding to these prepared in the above examples but containing in the 4-position of the pyridine ring a substituent such hydroxyl, amino and (lower)alkylamino are prepared by using as the starting reagent a compound containing a blocked group in the 4-position, e.g. 4-benzyloxy [C.A. 27, p. 1893] or 4-acetamido [C.A. 50, 3427i], and then removing the blocking group after the dicarbamate or dithiocarbamate has been prepared, as by catalytic hydrogenation or acid hydrolysis.

There is provided according to the present invention the compounds of the formulae

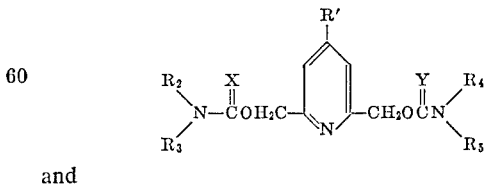

and

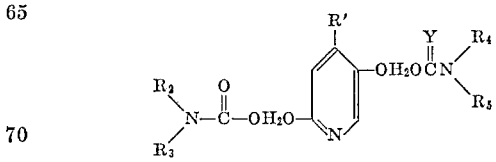

wherein X and Y are each a member selected from the group consisting of oxygen and sulfur; wherein R' is a member selected from the group consisting of hydrogen, chloro, bromo, iodo, fluoro, thiocyano, amino, hydroxyl, (lower)alkyl, (lower)alkoxy, (lower)alylamino, di(lower)alkylamino, (lower)alkanoylamino, (lower)alkylthio, (lower)alkylsulfonyl, and W—NH—, W—SO$_2$— and W—S— wherein W represents a radical of the formula

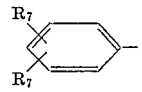

wherein R$_6$ and R$_7$ are each a member selected from the group consisting of hydrogen, chloro, nitro, trifluoromethyl, (lower)alkyl and (lower)alkoxy; wherein R$_2$ and R$_4$ are each a member selected from the group consisting of hydrogen (lower)alkyl and cycloalkyl having from four to seven carbon atoms inclusive; wherein R$_3$ and R$_5$ are each a member selected from the group consisting of hydrogen, (lower)alkyl, cycloalkyl having from four to seven carbon atoms inclusive, (lower)alkenyl, fluoro(lower)alkyl, furfuryl (including 2- and 3-furfuryl), pyridyl (including 2-, 3-, and 4-pyridyl), picolyl (including 2-3-, and 4-picolyl), pyrrolyl (including 2- and 3-pyrrolyl), 2-methylpyridyl [including 3-, 4-, 5- and 6-(2-methylpyridyl)], W— and W—(CH$_2$)$_n$— wherein W has the meaning set forth above and $n$ is an integer from one to three inclusive; wherein R$_2$ taken together with R$_3$ and R$_4$ taken together with R$_5$ represent a member selected from the group consisting of pentamethylene, hexamethylene and heptamethylene; and the nontoxic pharmaceutically acceptable salts thereof including the mineral acid salts such as the hydrochloride, sulfate, nitrate, etc. and the organic acid addition salts such as the acetate, citrate, ascorbate, tartrate and the like.

The preferred compounds of this invention are those in which R$_1$ in the formulae above is hydrogen and the ring substituents are in the 2 and 6 position; of such compounds the preferred are those in which R$_2$ and R$_4$ are each hydrogen. A more preferred subgroup of the compounds of this invention are those compounds of the formulae above wherein X and Y are both either oxygen or sulfur, R$_1$, R$_2$ and R$_4$ are each hydrogen and the ring substituents are in the 2 and 6 position; of these the especially preferred embodments are those in which R$_3$ and R$_5$ are (lower)alkyl.

The term "(lower)alkyl" as used herein refers to straight and branched chain saturated monovalent aliphatic hydrocarbon radicals having from one to ten carbon atoms inclusive, e.g., methyl, ethyl, propyl, isopropyl, butyl, normal and secondary and tertiary butyl, amyl, decyl, etc.

The preferred (lower)alkyl groups are those having from one to six carbon atoms. Similarly the term "lower)alk-" in such terms as (lower)alkoxy and (lower)alkylamino limits the alkyl moiety of the latter radicals to the same alkyl group as defined above.

The compounds of this invention are useful in the treatment of disease in animals, including particularly the higher animals such as man and horses, dogs, etc. The compounds are particularly useful in the treatment of inflammatory diseases, including purpura rheumatica, rheumatoid arthritis and angina pectoris, and in the treatment of the hypersecretion of secretory glands such as the sweat glands. The utility of the present compounds is enhanced by the absence of steroidal side effects and their lack of monoamine oxidase inhibiting activity.

The compounds are administered to the affected host in amounts ranging from 2 to 50 mg. per kilogram of body weight per day. The usual dosage is from about 5 to about 30 mg. per kg. per day. The compounds can be administered parenterally and, preferably, orally. The compounds can be orally administered in the conventional forms, i.e. as tablets, capsules, suspensions, etc. The compounds of this invention can be combined in one dosage form with other therapeutically effective agents, including analgesics and the steroids which have also been used in the treatment of inflammatory disease.

Starting materials

The final intermediates in the preparation of the symmetrical or "2,6-" compounds of the present invention are the 2,6-pyridinedimethanols of the formula

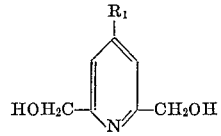

wherein R$_1$ has the meaning set forth above. R$_1$ is hydrogen in the preferred series.

These dimethanols are either disclosed in the literature or are prepared by known methods, e.g., by one of the following syntheses from the art:

(1) The corresponding 2,6-lutidines of the formula

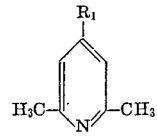

are oxidized by the procedure of Boekelheide et al., J. Amer. Chem. Soc., 76, 1286–1291 (1954);

(2) The corresponding di-aldehydes of the formula

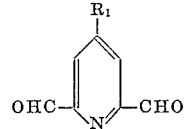

are oxidized by the procedure of Mathes et al., Berichte, 86, 584–588 (1953);

(3) Di-esters, illustrated as the diethyl ester, of the formula

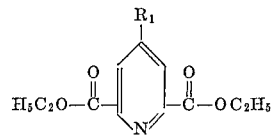

are reduced to the dimethanol by the use of a complex metal hydride (e.g. lithium aluminum hydride, di-isobutyl aluminum hydride, sodium borohydride) as disclosed, for example, by Barnes et al., J. Amer. Chem. Soc., 75, 3830–3831 (1953) or as used by Yoshida and Kumagae, Nippon Kagaku Zasshi, 81, 345–346 (1960) [C.A. 55, 6477g, (1961)] for the preparation of 2,5-pyridinedimethanol, which is also called 2,5-bis(hydroxymethyl)-pyridine, from dimethyl isocinchomeronate.

The 2,6-lutidines of the first procedure given above are prepared by the use of the appropriate reagents in syntheses know to the art, e.g. the Hantzch synthesis in which an aliphatic aldehyde is condensed with acetoacetic ester in the presence of ammonia to form a dihydropyridine which is readily oxidized by nitric acid to a pyridine derivative of the formula

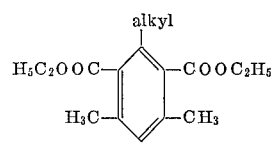

which is then readily hydrolzyed and decarboxylated to give the compound of the formula

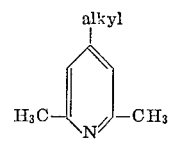

or the Chichibabin process [Bull. Soc. Chim. France, 3, 1607–32, (1936)] or the processes disclosed or discussed by Cislak in U.S. Patent 2,786,846 issued Mar. 26, 1957 or the procedures described in Pyridine and Its Derivatives, Part II, E. Klingsberg, Interscience, 1961, Chapter V, Alkyl and Aryl-pyridines pages 155–298 and the references cited therein.

The 2,6-diesters of the third procedure given above are prepared by conversion of chelidamic acid according to C.A. 51, 2776 to diethyl 4-chloro-2,6-pyridinedicarboxylate of the formula

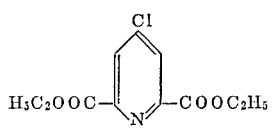

which is then reacted (a) with ammonia, amines, sodium alkoxides or sodium mercaptides or (b) in the malonic ester synthesis with compounds of the formula alkyl-$CH(COOC_2H_5)_2$ followed by the usual saponification and decarboxylation to give the desired diesters of 4-alkyl-2,6-pyridinedicarboxylic acids. When desired the chloro-diester is first reduced to the chloro-dimethanol and then used in the malonic ester synthesis.

In an alternative procedure such diesters are converted to the diacids which are reacted as salts with a compound such as ethyl chloroformate to give a mixed anhydride which is then converted to the diazide by reaction with sodium azide. Such diazides are easily reduced to dimethanols by reaction with complex metal hydrides, e.g. with sodium borohydride.

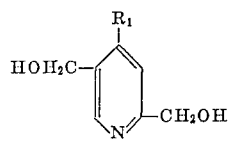

are prepared in similar fashion, e.g. by the third procedure set forth above from the corresponding diester or by the Boekelheide process as applied to a compound of the formula

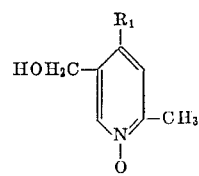

i.e. by successive reaction with acetic anhydride, and then with sodium hydroxide (cf. Yoshida et al., ibid.).

We claim:
1. A member selected from the group consisting of compounds of the formulae:

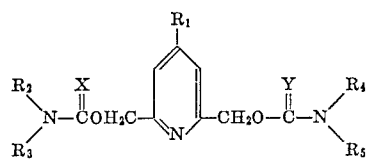

and

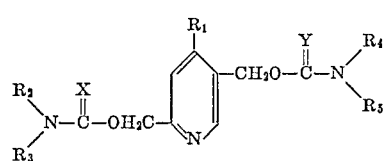

wherein X and Y are each a member selected from the group consisting of oxygen and sulfur and $R_1$ is a member selected from the group consisting of hydrogen, chloro, bromo, iodo, fluoro, (lower)alkyl, hydroxyl, (lower)alkoxy, amino, (lower)alkylamino, di-(lower)alkylamino, W—NH—, (lower)alkylthio, W—S— and (lower)alkylsulfonyl wherein W— represents a radical of the formula

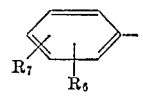

wherein $R_6$ and $R_7$ are each a member selected from the group consisting of hydrogen, chloro, nitro, (lower)alkyl, (lower)alkoxy and trifluoromethyl, $R_2$ and $R_4$ are each a member selected from the group consisting of hydrogen, (lower)alkyl and cyclohexyl and $R_3$ and $R_5$ each represent a member selected from the group consisting of hydrogen, (lower)alkyl, cyclohexyl, (lower)alkenyl, W— and W—$(CH_2)n$— wherein W was the meaning set forth above and $n$ is an integer from one to three inclusive, furfuryl, pyridyl, picolyl, methylpyridyl and pyrrolyl; and nontoxic, pharmaceutically acceptable acid addition salts thereof.

2. A compound of the formula:

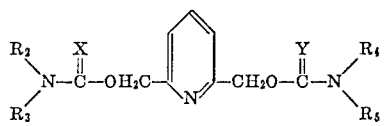

wherein X and Y are each a member selected from the group consisting of oxygen and sulfur, $R_2$ and $R_4$ are each a member selected from the group consisting of hydrogen, (lower)alkyl and cyclohexyl and $R_3$ and $R_5$ each represent a member selected from the group consisting of hydrogen, (lower)alkyl, cyclohexyl, (lower)alkenyl, W— and W—$(CH_2)n$— wherein W— has the meaning set forth above in claim 1 and $n$ is an integer from one to three inclusive, furfuryl, pyridyl, picolyl, methylpyridyl and pyrrolyl.

3. A compound of the formula:

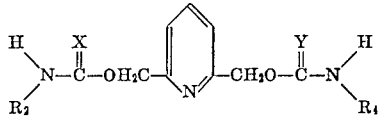

wherein X and Y are each a member selected from the group consisting of oxygen and sulfur and $R_2$ and $R_4$ are each a member selected from the group consisting of hydrogen, (lower)alkyl and cyclohexyl.

4. A compound of the formula:

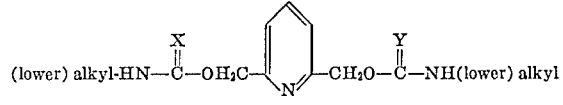

wherein X and Y are each a member selected from the group consisting of oxygen and sulfur.

5. A compound of the formula:

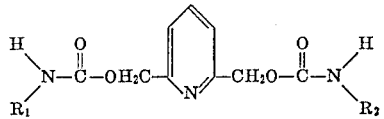

wherein $R_1$ and $R_2$ each represent (lower)alkyl.

6. A compound of the formula:

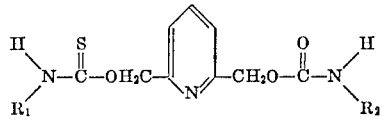

wherein $R_1$ and $R_2$ each represent (lower)alkyl.

7. A compound of the formula:

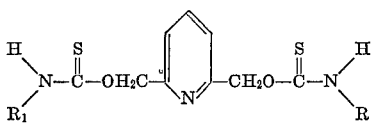

wherein $R_1$ and $R_2$ each represent (lower)alkyl.

8. 2,6 - bis(hydroxymethyl)pyridine di - (N - methylcarbamate).

9. 2,6 - bis(hydroxymethyl)pyridine di - (N - ethylcarbamate).

10. 4 - methylthio - 2,6 - bis(hydroxymethyl)pyridine di-(N-methylcarbamate).

11. 4 - ethylthio - 2,6 - bis(hydroxymethyl)pyridine di-(N-methylcarbamate).

12. 2,6-bis(hydroxymethyl)pyridine di-(N - $\beta$ - pyridylcarbamate).

References Cited
UNITED STATES PATENTS

| | | | |
|---|---|---|---|
| 2,839,536 | 6/1958 | Schnider et al. | 260—295 |
| 3,029,246 | 4/1962 | Rorig | 260—295 |

HENRY R. JILES, Primary Examiner

ALAN L. ROTMAN, Assistant Examiner

U.S. Cl. X.R.

260—293.4, 294.3, 295, 297; 424—266, 267